Aug. 26, 1969  N. W. WEBSTER ETAL  3,462,926
ROTARY MOWER SAFETY FENCE

Filed May 25, 1967

INVENTORS
NEIL W. WEBSTER
& CHARLES M. KLINE

BY *Joseph A. B____*
ATTORNEY

Aug. 26, 1969   N. W. WEBSTER ET AL   3,462,926
ROTARY MOWER SAFETY FENCE
Filed May 25, 1967   2 Sheets-Sheet 2

INVENTORS
NEIL W. WEBSTER
& CHARLES M. KLINE
BY
ATTORNEY

United States Patent Office 3,462,926
Patented Aug. 26, 1969

3,462,926
ROTARY MOWER SAFETY FENCE
Neil W. Webster, New Holland, and Charles M. Kline, Reinholds, Pa., assignors to Sperry Rand Corporation, New Holland, Pa., a corporation of Delaware
Filed May 25, 1967, Ser. No. 641,276
Int. Cl. A01d 35/26
U.S. Cl. 56—25.4       7 Claims

ABSTRACT OF THE DISCLOSURE

In a rotary mower, an elongated support which extends adjacent the ground and rotatably carries a plurality of crop cutting elements in side by side relation and having an overlying safety fence to keep people away from the cutting elements.

Background of invention

In recent years, high speed rotary mowers have appeared on the market for cutting dense crops. These mowers employ a plurality of cutting elements rotatable on vertical axes and supported from beneath on a transverse bar. The elements project both forwardly and rearwardly of the bar and they have knife means to cut the crop. Ordinarily, these elements rotate in planes just a few inches off the ground.

While such mowers are effective in cutting thick crop material, they are relatively hazardous to operate because the cutting elements are wholly unobstructed. To provide a safety guide fence in a mower of this type is a relatively difficult task because it is necessary to mount such a fence in a manner which will not obstruct the normal operation of the mower.

Description of invention

A main object of this invention is to provide in a rotary mower of the character described in a safety fence to keep people away from the cutting discs of the mower.

Another object of this invention is to provide a safety fence in a mower of the character described which is mounted by means which does not interfere with the normal function and operation of the mower.

Another object of this invention is to provide a rotary mower safety fence which will keep people from the front of the cutting elements and also from the rear thereof and supported by means which does not interfere with the normal rotation of the cutting elements.

A further object of this invention is to provide a rotary mower safety fence which is supported in only limited locations but has substantial strength and stability.

Another object of this invention is to provide a rotary mower safety fence which is relatively inexpensive to construct and install.

Other objects of this invention will be apparent hereinafter from the specification and from the recital in the appended claims.

Description of the preferred embodiment

Figure 2:
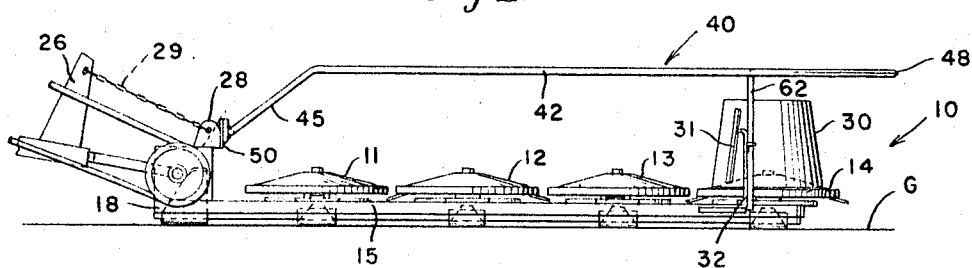
FIG. 2 is a rear elevation of FIG. 1.
Figure 3:
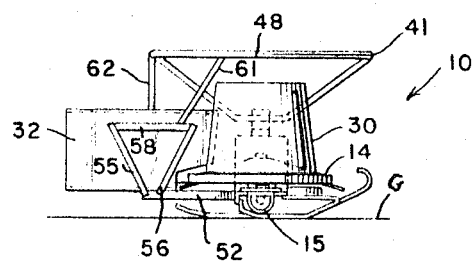
FIG. 3 is a view of the mower looking from right to left of FIG. 2.

Referring now to the drawings by numerals of reference, 10 denotes generally a high speed rotary mower having crop cutting elements in the form of discs 11, 12, 13 and 14 rotatable in side by side relation on a transverse support bar 15 which extends adjacent the ground G, FIGS. 2 and 3. The cutting elements rotate about parallel vertically extending axes and each has two knives 16 one hundred and eighty degrees apart which project radially of the respective elements. The elements are angularly disposed relative to each other so that the knives do not engage each other when the elements rotate.

The means for rotating the elements is contained in support bar 15 and is driven from a gearbox 18 at the inboard end of the mower. The gearbox receives power from a sheave 20 and drive belts 21. The mower as a whole is supported on frame 22 having a bracket 24 which connects to the gearbox 18 at location 25. The mower also has an upright arm 26 which is connected to a tab 28 on gearbox 18 by means of a support chain 29. Additional support structure is also employed but not shown here.

Figure 1:
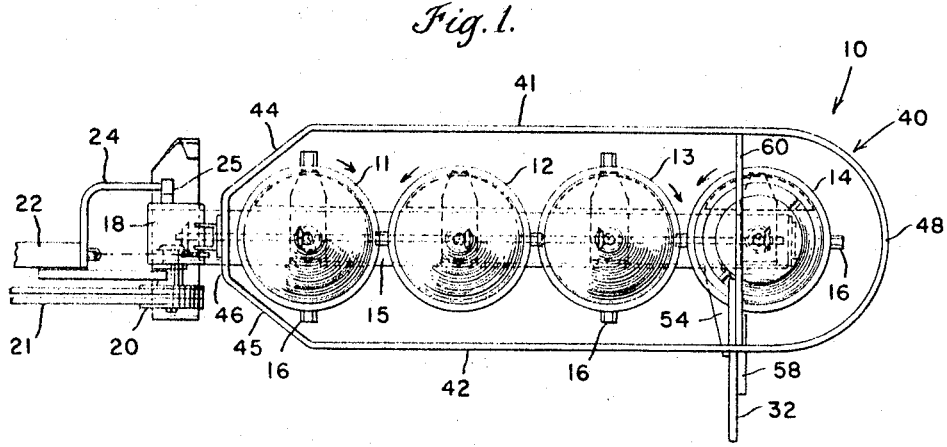
FIG. 1 is a plan view of a rotary mower having a safety fence constructed according to this invention.

All of the disc elements 11–14 are of the same diameter. The outboard element 14 has a truncated cone 30 having vertically extending ribs 31 to engage the crop material and facilitate its separation from the standing crop not cut by the mower. As the drum 30 rotates, it turns in a counterclockwise direction when viewed as shown in FIG. 1 and the ribs 31 cast the material rearwardly. A vertically extending deflector plate 32 is provided to intercept the material being conveyed by the drum 30 and to resist its conveyance back into the standing crop material.

The disc elements 11–14 have a diameter greater than the width of the support bar 15. The knife means 16 on the elements project both forwardly and rearwardly of the bar and the elements are adapted to rotate at very high speeds such as three thousand r.p.m. To help keep people away from the cutting elements when the machine is operating in the field, a safety fence 40 is provided having spaced parallel transverse rails, namely forward rail 41 and rearward rail 42. At the inner end of the fence, there are diagonal sections 44 and 45 which extend downwardly from the side rails 41 and 42 and these diagonal rail sections are interconnected by a fore-and-aft piece 46. The outboard end of the fence is curved at 48 the arc is generally concentric to the axis of rotation of the outboard disc element 14.

Figure 4:
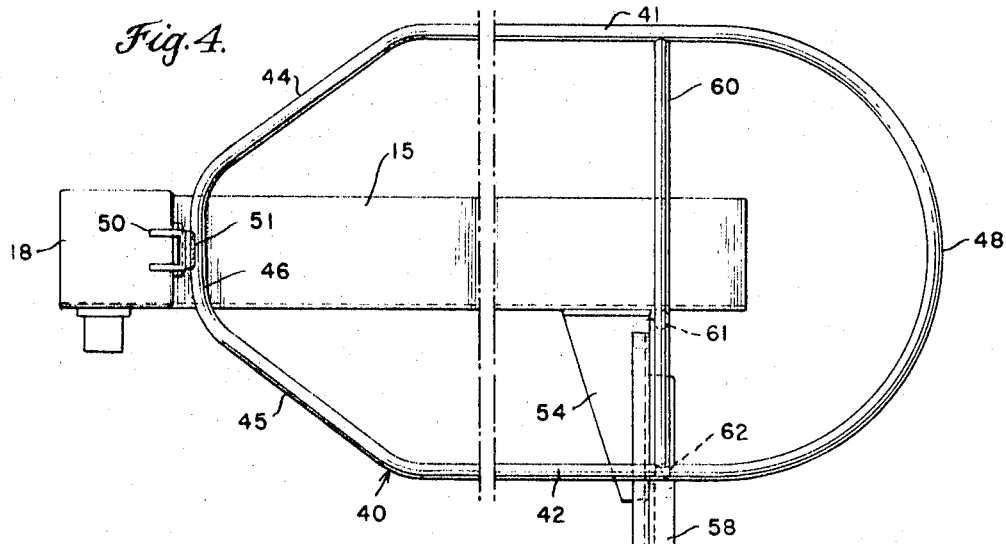
FIG. 4 is an enlarged, broken, plan view of the safety fence and the baffle of the mower, illustrating the manner of securing the fence to the mower outboard end and to the gearbox at its inboard end.
Figure 5:
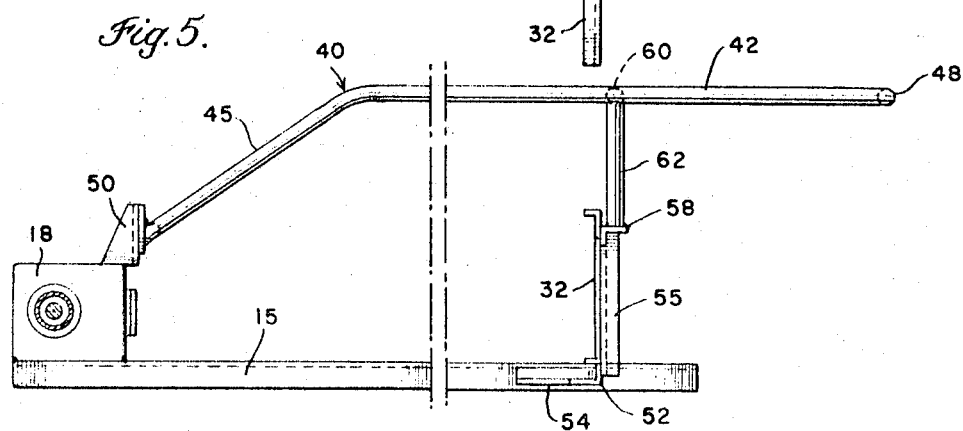
FIG. 5 is a rear view of FIG. 4.
Figure 6:
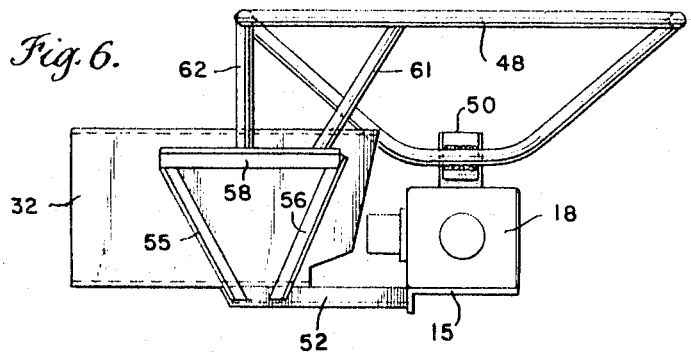
FIG. 6 is a view looking from right to left of FIG. 5.

As best shown in FIGS. 4–6, gearbox 18 has an upstanding U-shaped member 50 to which the rail portion 46 is welded at 51. This supports the inner end of the fence on the mower support frame. At the outer end of fence 40, the structure is supported by the bracket 52 which carries deflector 32. Bracket 52 extends rearwardly from the mower support 15 and a gusset 54 is provided between the bracket and support 15. Bracket 52 and gusset 54 project in a horizontal plane beneath outboard disc element 14 and at its rearward end bracket 52 has upwardly extending members 55 and 56 interconnected at their divergent upper ends by a brace element 58. Deflector 32 is rigidly connected to the members 55, 56 and 58 and this helps to provide rigidness for the bracket structure.

Adjacent its outboard end, fence 40 has a fore-and-aft arm 60 from which two support legs 61 and 62 depend. These legs 61 and 62 are secured by welding or the like to the top of bracket section 58. The inclined leg 61 projecting forwardly provides support for the forward rail 41 of fence 40. The leg 62 supports the rearward rail 42 of the fence and the bracket 50 at gearbox 18 provides a solid support for the entire structure.

As shown in FIG. 1, the diameter of the disc elements including the knife means 16 is less than the distance between front rail 41 and rear rail 42 of the fence. This is designed to keep people away from the path of travel of the elements. In like respect, the arcuate outer section 48 projects radially outwardly of the path of the knives 16 on the discs 14.

With the fence structure described, the gearbox 18 and deflector 32 which are ordinarily provided with a rotary mower of this type, are used as the mounting means for the safety fence. With this structure, no obstruction in the normal operation of the mower occurs.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a rotary mower, a bar which extends adjacent the ground and transverse to the direction of travel of the mower, said bar having an inner and an outer end, a support connected to said inner end of said bar to carry the bar generally horizontally, a plurality of crop cutting elements mounted in side by side relation on said bar and rotatable in a generally common plane about vertically extending axes, said elements projecting forwardly and rearwardly of said bar and having knife means for cutting crop material, a bracket connected to said bar adjacent said outer end and projecting rearwardly beneath said plane of rotation of said elements and then upwardly and rearwardly of the elements, a safety fence overlying said elements and spaced vertically thereof, said fence having a front rail forwardly of said elements, means connecting an inner ed of said fence to said support, and means connecting an outer end of said fence to said bracket.

2. In a rotary mower as recited in claim 1 wherein said crop cutting elements comprise discs and said fence has a rear rail rearwardly of said discs, the space between said front and rear rails being greater than the diameter of a disc and said knife means thereon.

3. In a rotary mower as recited in claim 1 wherein said bracket has a fore-and-aft brace element spaced vertically of said bar, a first inclined leg connecting said fence to a forward end of said brace element and a second leg connecting the fence to the brace element at a location rearwardly of said forward end.

4. In a rotary mower as recited in claim 3 wherein said first and second legs are rearwardly of the means connecting said fence inner end to said support and they are connected to a fore-and-aft arm which connects the front and rear rails intermediate the ends thereof.

5. In a rotary mower as recited in claim 1 wherein a gusset is connected between said bracket and said bar in a horizontally extending plane beneath said plane of rotation of said elements.

6. In a rotary mower as recited in claim 1 wherein the outermost element rotates in a counterclockwise direction when viewed from above and rearwardly of the mower, and a deflector is provided which extends vertically to intercept and discharge material cut by said outermost element, said deflector being attached to said bracket and providing support for said fence.

7. In a rotary mower as recited in claim 6 wherein said support includes a gearbox which drives the mower, said inner end of said fence being connected to said gearbox.

References Cited

UNITED STATES PATENTS

| | | | |
|---|---|---|---|
| 2,481,798 | 9/1949 | Turner et al. | 56—25.4 |
| 2,494,271 | 1/1950 | Turner et al. | 56—25.4 |
| 2,720,740 | 10/1955 | Price | 56—25.4 |
| 2,732,675 | 1/1956 | Smith et al. | 56—6 |
| 2,974,469 | 3/1961 | Smith et al. | 56—25.4 |
| 3,103,090 | 9/1963 | Campbell | 56—6 |

RUSSELL R. KINSEY, Primary Examiner